US012358127B2

(12) United States Patent
Maleki et al.

(10) Patent No.: US 12,358,127 B2
(45) Date of Patent: Jul. 15, 2025

(54) ROBOTIC ARM

(71) Applicant: Sanctuary Cognitive Systems Corporation, Vancouver (CA)

(72) Inventors: Hessam Maleki, Burnaby (CA); Connor Richard Shannon, Vancouver (CA); Seymur Dadashov, Richmond (CA); James Zhong Sheng Liu, Burnaby (CA); Matthew Hill, Vancouver (CA)

(73) Assignee: Sanctuary Cognitive Systems Corporation, Vancouver (CA)

(*) Notice: Subject to any disclaimer, the term of this patent is extended or adjusted under 35 U.S.C. 154(b) by 0 days.

(21) Appl. No.: 18/610,859

(22) Filed: Mar. 20, 2024

(65) Prior Publication Data

US 2024/0316759 A1      Sep. 26, 2024

Related U.S. Application Data

(60) Provisional application No. 63/453,587, filed on Mar. 21, 2023.

(51) Int. Cl.
*B25J 9/10*  (2006.01)
*B25J 9/12*  (2006.01)

(52) U.S. Cl.
CPC .............. *B25J 9/106* (2013.01); *B25J 9/126* (2013.01)

(58) Field of Classification Search
CPC ............... B25J 17/0233; B25J 17/0258; B25J 17/0266; B25J 9/106

USPC ........................................................... 901/29
See application file for complete search history.

(56) References Cited

U.S. PATENT DOCUMENTS 8,297,672 B2 * 10/2012 Kim ..................... B25J 9/104
                                                       901/29

FOREIGN PATENT DOCUMENTS

| CN | 113459154 A | * | 10/2021 | |
|---|---|---|---|---|
| EP | 3287114 A1 | * | 2/2018 | ............ A61H 1/024 |
| WO | WO-2006064625 A1 | * | 6/2006 | .......... B25J 17/0258 |
| WO | WO-2007088743 A1 | * | 8/2007 | .......... B25J 15/0009 |
| WO | WO-2018074101 A1 | * | 4/2018 | .......... B25J 15/0009 |
| WO | WO-2019211791 A1 | * | 11/2019 | ............ B25J 9/0006 |

* cited by examiner

*Primary Examiner* — Bobby Rushing, Jr.
(74) *Attorney, Agent, or Firm* — Adenike Adebiyi; Thomas Mahon

(57) ABSTRACT

A robotic wrist for a robotic arm includes a hybrid differential with a first cam, a second cam, a first differential input, and a second differential input. The first cam and the second cam are disposed about first and second pivots oriented along a first rotational axis. An abduction output is coupled to the second cam and has a second rotational axis transverse to the first rotational axis. The robotic wrist includes a first actuator, a second actuator, a first link coupling an output of the first actuator to the first differential input, and a second link coupling an output of the second actuator to the second differential input. Synchronous motion of the actuators causes flexion of the abduction output about the first rotation axis, and asynchronous motion of the actuators causes abduction motion of the abduction output about the second rotation axis.

14 Claims, 12 Drawing Sheets

ROBOTIC ARM

CROSS-REFERENCE TO RELATED APPLICATIONS

This application claims the benefit of U.S. Provisional Application No. 63/453,587 filed Mar. 21, 2023, the content of which is incorporated herein by reference.

FIELD

The field generally relates to articulated arms and in particular to articulated arms for humanoid robots.

BACKGROUND

Robots are machines that can sense their environments and perform tasks autonomously or semi-autonomously or via teleoperation. A humanoid robot is a robot or machine having an appearance and/or character resembling that of a human. Humanoid robots can be designed to function as team members with humans in diverse applications, such as construction, manufacturing, monitoring, exploration, learning, and entertainment. Humanoid robots can be particularly advantageous in substituting for humans in environments that may be dangerous to humans or uninhabitable by humans.

There continues to be a need for a robot that can be easily integrated into diverse environments to assist or substitute for humans.

SUMMARY

Disclosed herein are examples of a robotic wrist that can be used as a segment of an articulated arm for a robot (e.g., a humanoid robot). Also disclosed herein are examples of a robotic arm including the robotic wrist.

In a first representative example, a robotic wrist includes a hybrid differential including a first cam, a second cam, a first differential input, and a second differential input. The first cam is disposed about a first pivot oriented along a first axis of rotation. The second cam is disposed about a second pivot oriented along the first axis of rotation. The robotic wrist includes an abduction output coupled to the second cam. The abduction output has a second axis of rotation that is transverse to the first axis of rotation. The robotic wrist includes a first actuator having a first actuator output, a second actuator having a second actuator output, a first link coupling the first actuator output to the first differential input, and a second link coupling the second actuator output to the second differential input. Synchronous motion of the first actuator and the second actuator causes flexion motion of the abduction output about the first axis of rotation. Asynchronous motion of the first actuator and the second actuator causes abduction motion of the abduction output about the second axis of rotation.

In a second representative example, a robotic arm includes a robotic shoulder, a robotic elbow coupled at one end to the robotic shoulder, and a robotic wrist coupled at one end to another end of the robotic elbow. The robotic wrist includes a hybrid differential having a first cam, a second cam, a first input, and a second input. The first cam is disposed about a first pivot oriented along a first axis of rotation. The second cam is disposed about a second pivot oriented along the first axis. An abduction output is coupled to the second cam. The abduction output has a second axis of rotation transverse to the first axis; a first actuator having an output. A first link couples an output of a first actuator to the first input of the hybrid differential. A second link couples an output of a second actuator to the second input of the hybrid differential. Synchronous motion of the first actuator and the second actuator causes flexion motion of the abduction output about the first axis, and asynchronous motion of the first actuator and the second actuator causes abduction motion of the abduction output about the second axis.

In a third representative example, a robot includes a robotic torso, a robot head coupled to the robot torso, at least one of a robot leg coupled to the robot torso or a mobile platform coupled to the robot torso, and at least one robotic arm coupled to the robot torso. The at least one robotic arm includes a robotic shoulder, a robotic elbow coupled at one end to the robotic shoulder, and a robotic wrist coupled at one end to another end of the robotic elbow. The robotic wrist includes a hybrid differential having a first cam, a second cam, a first input, and a second input. The first cam is disposed about a first pivot oriented along a first axis of rotation. The second cam is disposed about a second pivot oriented along the first axis. An abduction output is coupled to the second cam. The abduction output has a second axis of rotation transverse to the first axis; a first actuator having an output. A first link couples an output of a first actuator to the first input of the hybrid differential. A second link couples an output of a second actuator to the second input of the hybrid differential. Synchronous motion of the first actuator and the second actuator causes flexion motion of the abduction output about the first axis, and asynchronous motion of the first actuator and the second actuator causes abduction motion of the abduction output about the second axis.

In another representative example, a robotic wrist includes a frame, an interface disposed at one end of the frame having features enabling connection of the frame to an elbow of a robotic arm, a first actuator and a second actuator disposed in the frame such that axes of rotation of the first and second actuators are parallel, a first link coupled to a rotary output of the first actuator at one end and at another end to one input of a hybrid differential, and a second link coupled at one end to a rotary output of the second actuator and at another end to a second input of the hybrid differential. The hybrid differential is rotatably coupled to the frame such that a first axis of rotation is parallel to axes of rotation of the first and second actuators. The hybrid differential includes a spherical link coupled between a linear motion input and an effector interface output rotatably mounted on the hybrid differential along a second axis transverse to the first axis. The first link is coupled at another end to a first input to the hybrid differential. The second link is coupled at another end to the linear motion input to the hybrid differential. Synchronous motion of the first actuator and the second actuator causes flexion motion of the effector interface about the first axis. Asynchronous motion of the first and second actuators causes abduction motion of the effector interface about the second axis.

In another representative example, a robotic arm includes a robotic shoulder having three degrees of freedom. The robotic shoulder has an interface for coupling to a robot body at one end and an interface for coupling to a robotic elbow at another end. The robotic arm includes a robotic elbow coupled at one end to the other end of the robotic shoulder. The robotic elbow has two degrees of freedom and includes an interface for coupling to a robotic wrist at another end. The robotic arm includes a robotic wrist coupled at one end to the other end of the robotic elbow. The robotic wrist includes a frame, an interface disposed at one end of the frame having features enabling connection of the frame to an elbow of a robotic arm, a first actuator and a second actuator disposed in the frame such that axes of rotation of the first and second actuators are parallel, a first link coupled to a rotary output of the first actuator at one end and at another end to one input of a hybrid differential, a second link coupled at one end to a rotary output of the second actuator and at another end to a second input of the hybrid differential. The hybrid differential is rotatably coupled to the frame such that a first axis of rotation is parallel to axes of rotation of the first and second actuators. The hybrid differential includes a spherical link coupled between a linear motion input and an effector interface output rotatably mounted on the hybrid differential along a second axis transverse to the first axis. The first link is coupled at another end to a first input to the hybrid differential. The second link is coupled at another end to the linear motion input to the hybrid differential. Synchronous motion of the first actuator and the second actuator causes flexion motion of the effector interface about the first axis. Asynchronous motion of the first and second actuators causes abduction motion of the effector interface about the second axis.

In another representative example, a robot includes a robot body having a robot torso, a robot head coupled to the robot torso, at least one of a robot leg coupled to the robot torso or a mobile platform coupled to the robot torso, and a robotic arm. The robotic arm includes a robotic shoulder having three degrees of freedom. The robotic shoulder has an interface for coupling to a robot body at one end and an interface for coupling to a robotic elbow at another end. The robotic arm includes a robotic elbow coupled at one end to the other end of the robotic shoulder. The robotic elbow has two degrees of freedom and includes an interface for coupling to a robotic wrist at another end. The robotic arm includes a robotic wrist coupled at one end to the other end of the robotic elbow. The robotic wrist includes a frame, an interface disposed at one end of the frame having features enabling connection of the frame to an elbow of a robotic arm, a first actuator and a second actuator disposed in the frame such that axes of rotation of the first and second actuators are parallel, a first link coupled to a rotary output of the first actuator at one end and at another end to one input of a hybrid differential, a second link coupled at one end to a rotary output of the second actuator and at another end to a second input of the hybrid differential. The hybrid differential is rotatably coupled to the frame such that a first axis of rotation is parallel to axes of rotation of the first and second actuators. The hybrid differential includes a spherical link coupled between a linear motion input and an effector interface output rotatably mounted on the hybrid differential along a second axis transverse to the first axis. The first link is coupled at another end to a first input to the hybrid differential. The second link is coupled at another end to the linear motion input to the hybrid differential. Synchronous motion of the first actuator and the second actuator causes flexion motion of the effector interface about the first axis. Asynchronous motion of the first and second actuators causes abduction motion of the effector interface about the second axis.

DETAILED DESCRIPTION

General Considerations

Figure 1:
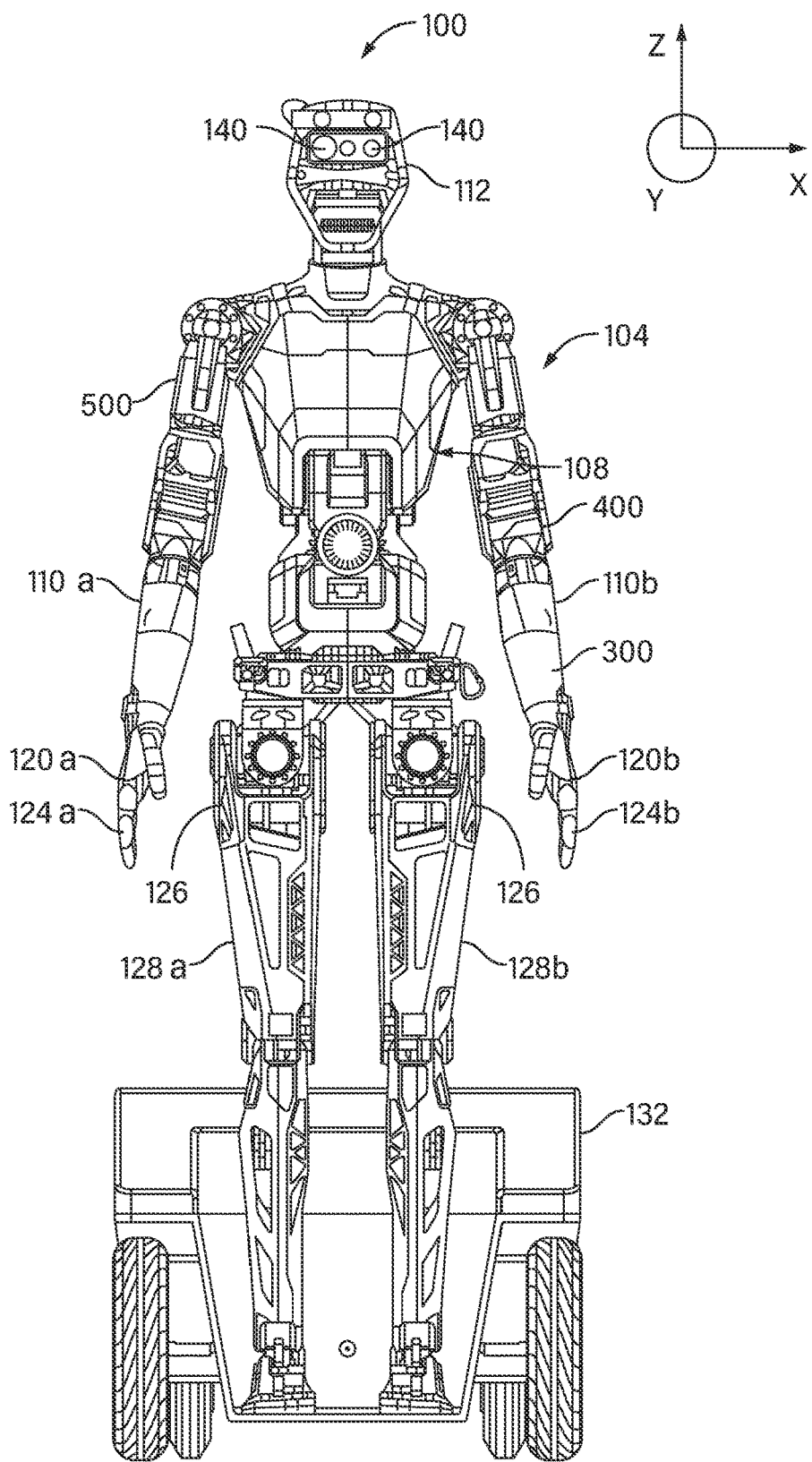
FIG. 1 is a front view of an example robot standing on a mobile base.

For the purpose of this description, certain specific details are set forth herein in order to provide a thorough understanding of disclosed technology. In some cases, as will be recognized by one skilled in the art, the disclosed technology may be practiced without one or more of these specific details, or may be practiced with other methods, structures, and materials not specifically disclosed herein. In some instances, well-known structures and/or processes associated with robots have been omitted to avoid obscuring novel and non-obvious aspects of the disclosed technology.

All the examples of the disclosed technology described herein and shown in the drawings may be combined without any restrictions to form any number of combinations, unless the context clearly dictates otherwise, such as if the proposed combination involves elements that are incompatible or mutually exclusive. The sequential order of the acts in any process described herein may be rearranged, unless the context clearly dictates otherwise, such as if one act or operation requests the result of another act or operation as input.

In the interest of conciseness, and for the sake of continuity in the description, same or similar reference characters may be used for same or similar elements in different figures, and description of an element in one figure will be deemed to carry over when the element appears in other figures with the same or similar reference character, unless stated otherwise. In some cases, the term "corresponding to" may be used to describe correspondence between elements of different figures. In an example usage, when an element in a first figure is described as corresponding to another element in a second figure, the element in the first figure is deemed to have the characteristics of the other element in the second figure, and vice versa, unless stated otherwise.

The word "comprise" and derivatives thereof, such as "comprises" and "comprising", are to be construed in an open, inclusive sense, that is, as "including, but not limited to." The singular forms "a", "an", "at least one", and "the" include plural referents, unless the context dictates otherwise. The term "and/or", when used between the last two elements of a list of elements, means any one or more of the listed elements. The term "or" is generally employed in its broadest sense, that is, as meaning "and/or", unless the context clearly dictates otherwise. When used to describe a range of dimensions, the phrase "between X and Y" represents a range that includes X and Y. As used herein, an "apparatus" may refer to any individual device, collection of devices, part of a device, or collections of parts of devices.

The term "coupled" without a qualifier generally means physically coupled or lined and does not exclude the presence of intermediate elements between the coupled elements absent specific contrary language. The term "plurality" or "plural" when used with reference to an element means two or more of the element. Directions and other relative references (e.g., inner and outer, upper and lower, above and below, and left and right) may be used to facilitate discussion of the drawings and principles but are not intended to be limiting.

The section headings and Abstract are provided for convenience only and are not intended, and should not be construed to interpret the scope or meaning of the disclosed technology.

Technology Considerations

The various actuators described herein may be rotary actuators, e.g., electric, hydraulic or pneumatic motors. Electric motor actuators may comprise, e.g., AC or DC motors, stepper motors, servo motors or synchronous rotation motors. In some examples, a rotating shaft comprising the rotary output of one or more of such actuators may have a hollow cross-section to enable passage therethrough of cables and lines. In some examples, the rotating shaft may comprise an attached or integrally formed flange to enable transfer of rotation of the shaft to, for example, linear motion, such as by attaching one or more links to such flange. Such link attachment may be direct or through one or more intermediate structures. In some examples, the flange(s) may have implemented therein a torque sensor. Such torque sensor(s) may comprise strain gauges, such as Wheatstone bridge-type resistive strain gauges, wherein rotational deformation of the respective flange may induce detectable strain at one or more points proximate the rim of the respective flange.

Reference may be made herein to "shoulder bolts" used, among other reasons, to attach or couple a link, bar, or rod to a rotating device such as an actuator shaft flange. Such shoulder bolts may have a substantially cylindrical, smooth surface shank extending, for example, from the bolt head for specific length. Beyond the shank may be a threaded end. The shank may have diameter selected to provide a close fit inside an inner race of a bearing or bushing pressed into or otherwise disposed in an end of the relevant link, bar, or rod. The length of the shank may be selected such that when the shoulder bolt is fully threaded into a threaded receptacle (e.g., the above mentioned flange), the respective link is able to rotate freely relative to the flange, while having the bolt engage the threaded receptacle with sufficient friction to resist unthreading. Thus, rotary motion of the actuator may be transferred into linear motion of the link.

Some examples of the actuators may comprise driver circuits disposed proximate each actuator to enable detection of low current control signals from a remote device and convert the foregoing control signals into high current signals to cause the required rotation of the respective actuator. Some examples may comprise separate or integral (with the respective actuator) rotary orientation or other rotational motion sensors (e.g., optical encoders or magnetic encoders) in order to provide the relevant control circuit(s) with indication of the amount of movement of the actuator and/or its rotary orientation at any time.

All of the foregoing considerations are to be understood as convenient implementations in the various examples described herein, and except as otherwise necessitated by the context are not to be construed as limitations on the scope of this disclosure.

Example I—Overview

Described herein are examples of an articulated robotic arm having multiple arm segments that are coupled together and movable relative to each other. The arm segments can include a wrist segment (referred to herein as "robotic wrist"), an elbow segment (referred to herein as "robotic elbow"), and a shoulder segment (referred to herein as "robotic shoulder"). An end effector (e.g., a hand-appearing device for grasping objects) can be attached to a component interface at a free end of the robotic wrist. The arm segments have various degrees of freedom that are controllable to configure a position and pose of the end effector in a three-dimensional space. In some examples, the robotic wrist may use a hybrid differential mechanism having two output arms whose positions and/or orientations are dependent upon each other to effect two degrees of freedom (e.g., flexion and abduction) at the component interface.

Example II—Example Humanoid Robot

FIG. 1 illustrates an example robot 100 having a humanoid form. The robot 100 includes a robot body 104 having a robotic torso 108, a robotic head 112, robotic arms 110a, 110b (as explained above), and end effectors, which may be robotic hands 120a, 120b. The robotic head 112 can include one or more robotic vision sensors 140 (e.g., cameras), which the robot 100 can use to collect optical and related information from its environment. The robotic arms 110a, 110b which will be explained in more detail below, are coupled to opposite sides of the robotic torso 108. The robotic hands 120a, 120b (or end effectors) are coupled to the free ends of the robotic arms 110a, 110b. The robotic hands 120a, 120b can include one or more digits 124a, 124b (or articulable members), which the robot 100 can use to interact with objects in the environment or to make gestures.

The robot body 104 can include one or more robotic legs. In the illustrated example, the robotic legs 128a, 128b, may be coupled to the robotic torso 108 by a robotic hip 126. In the illustrated example, the robotic legs 128a, 128b are attached to a mobile base 132 (e.g., a wheeled platform). In some examples, the robot 100 can be bipedal (e.g., the robot 100 can walk with the robotic legs 128a, 128b). In other examples, the robot body 104 may omit robotic legs and can still be considered to have a humanoid form. In these other examples, the robotic torso 108 may include a base mounted on a pedestal, which can be attached to a mobile base such as a wheeled base as shown in FIG. 1.

Example III—Example Robotic Arm

Figure 2:
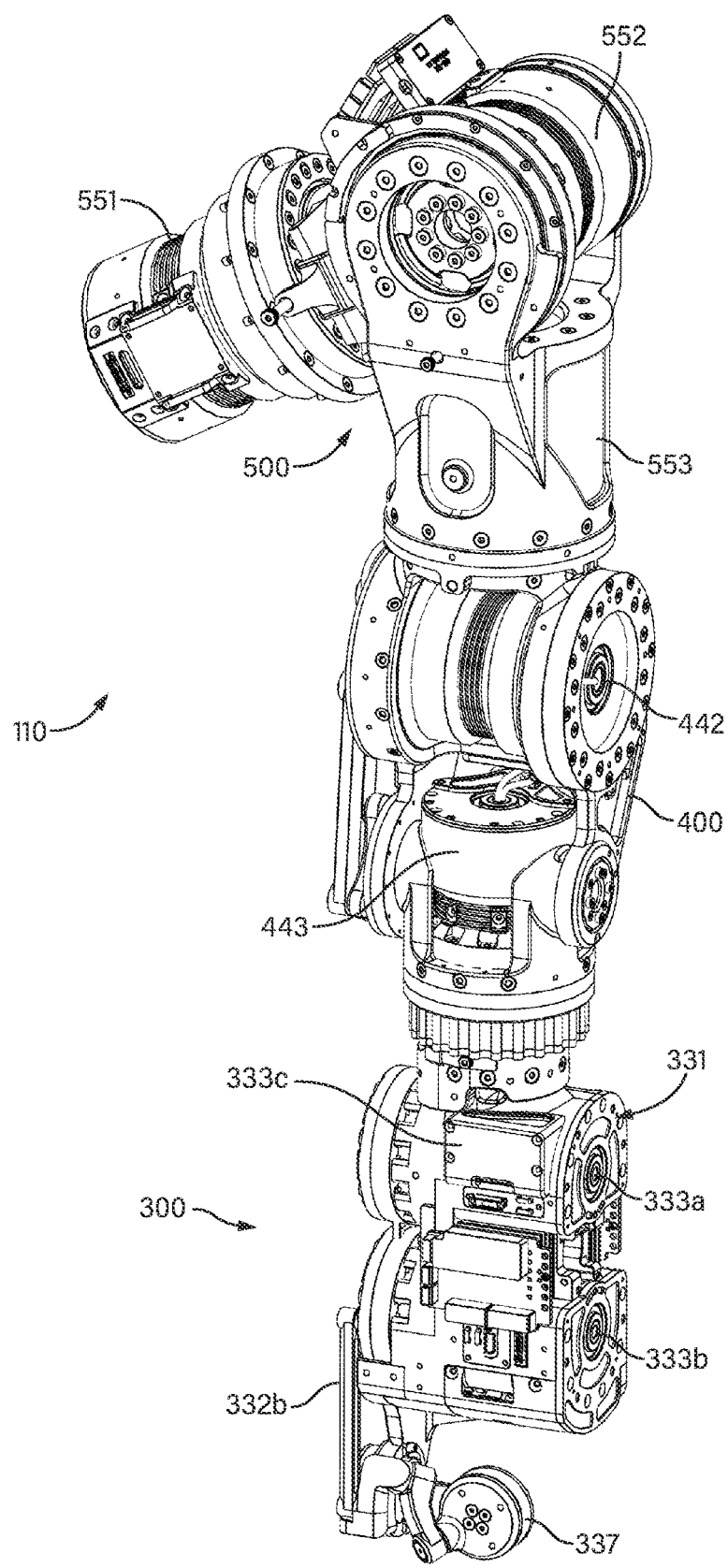
FIG. 2 is an oblique view of an example robotic arm.

FIG. 2 shows an overview of an example robotic arm 110 such as may be used with a humanoid robot (e.g., as any of the robotic arms 110a, 110b shown in FIG. 1 and discussed in Example II). The robotic arm 110 may comprise a robotic wrist 300, a robotic elbow 400, and a robotic shoulder 500.

The robotic wrist 300 (see FIGS. 3A-3D and Example IV) may have two degrees of freedom (e.g., rotation about two different centers of axes of rotation). The robotic wrist 300 may use a hybrid differential mechanism 331 (which means that the output arms of the mechanism are dependent on each other) to effect the two degrees of freedom at a single component interface 337. In some examples, the hybrid differential mechanism 331 moves (e.g., flexion motion) about a first axis (see C3 in FIG. 3A) and moves (e.g., abduction motion) about a second axis (see C4 in FIG. 3A). The hybrid differential mechanism 331 can be driven by actuators 333a, 333b. The hybrid differential mechanism 331 can include two linkage arms 332a, 332b coupled to the actuators 333a, 333b. The two linkage arms 332a, 332b provide two separate load paths for flexion and abduction. When the hybrid differential mechanism 331 operates to effect flexion motion, both the actuators 333a, 333b move (e.g., rotate) synchronously so that the two linkage arms 332a, 332b move synchronously. When the two actuators 333a, 333b rotate asynchronously (e.g., rotate in opposed directions or only one actuator rotates), a difference in relative angle between the two linkage arms 332a, 332b results. The difference in angle between the two linkage arms 332a, 332b causes abduction motion about the second axis (see C4 in FIG. 3A). The component interface 337 may be coupled to the hybrid differential mechanism 331 such that movement of the hybrid differential mechanism 331 causes movement of a component attached to the component interface 337. In some examples, the actuators 333a, 333b can be included in a single package (e.g., a dual actuator 333c), which can avoid a bulky ("Popeye"-like appearance) robotic wrist and can help maintain alignment of the actuators 333a, 333b.

The robotic wrist 300 includes an elbow interface (see 336 in FIG. 3A) for connection to the robotic elbow 400. The robotic elbow 400 (see FIGS. 4A-4C and Example V) may have two degrees of freedom. The robotic elbow 400 in some examples uses a two-bar linkage mechanism comprising links 441A, 441B (which can also be referred to as a four-bar mechanism or four-link mechanism) coupled to the output (e.g., a rotary output of a flexion actuator 441 as shown in FIG. 4A) and to a flexion frame for flexion movement. Other mechanisms besides a two-bar linkage may be used (e.g., a pulley system). The robotic elbow 400 includes a rotation actuator 443 for rotation/yaw movement. The bars in the two-bar linkage mechanism 441a, 441b (shown in FIG. 4B) may be respectively coupled to the actuator output (or to the actuator shaft) of the flexion actuator 441 and to the flexion frame (see FIGS. 4A through 4C) so as to be rotationally phase-displaced from each other. In some examples, the rotational phase displacement may be 90 degrees. By such attachment of the bars, rotational position of the link coupling to the flexion actuator 441 (shown in FIG. 4B) will not affect the torque capacity of the flexion actuator 441 to cause flexional movement of the robotic elbow 400. The rotation actuator 443 may be coupled at its rotational output or directly at its output shaft to the robotic wrist 300 such that the robotic wrist 300 may be rotated about an axis, to be described further herein.

The robotic elbow 400 may include an interface for connection to the robotic shoulder 500. The robotic shoulder 500 (see FIGS. 5A-5C and Example VI) may have three degrees of freedom provided by respective actuators 551, 552, 553, e.g., rotary actuators. The first actuator 551 (shown in FIG. 5A), which may be referred to as a flexion actuator, may be mounted directly or through a fixed coupling to the robotic torso (108 in FIG. 1) and can form a movable connection between the robotic arm 100 and the robotic torso (108 in FIG. 1). The flexion actuator 551 provides flexion movement (i.e., deflection of the axis of the robotic arm 110a, 110b or, expressed differently, rotation about an X-axis in the frame of reference of the robot 100 in FIG. 1) of the robotic arm 110a, 110b relative to the robotic torso (108 in FIG. 1)). The second actuator 552 provides abduction movement (rotation about a Y-axis). The third actuator 553 provides rotation/yaw movement (rotation about a Z-axis).

Example IV—Example Robotic Wrist

Figure 3A:
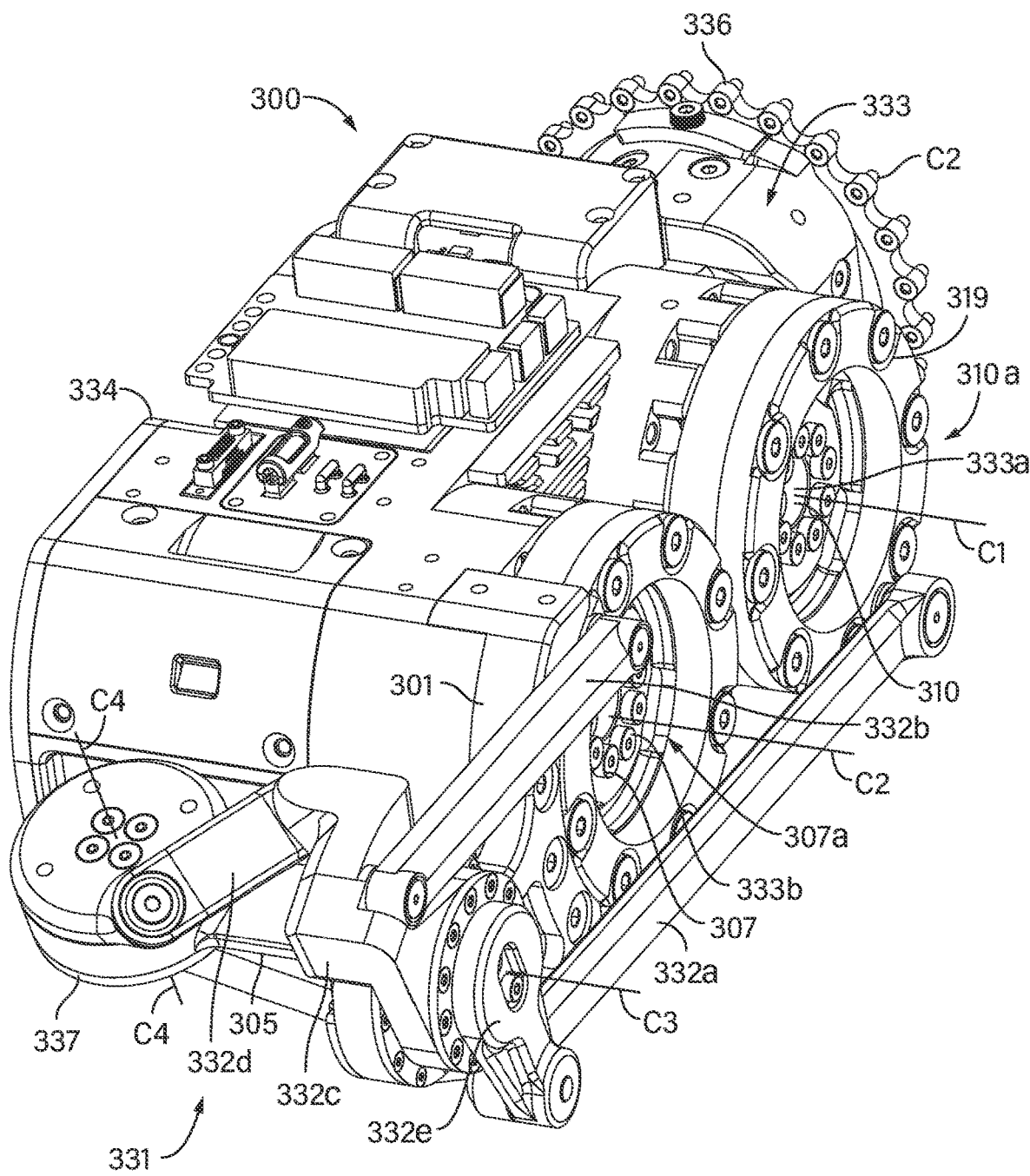
FIG. 3A is a perspective view of a robotic wrist in the robotic arm shown in FIG. 2.
Figure 3B:
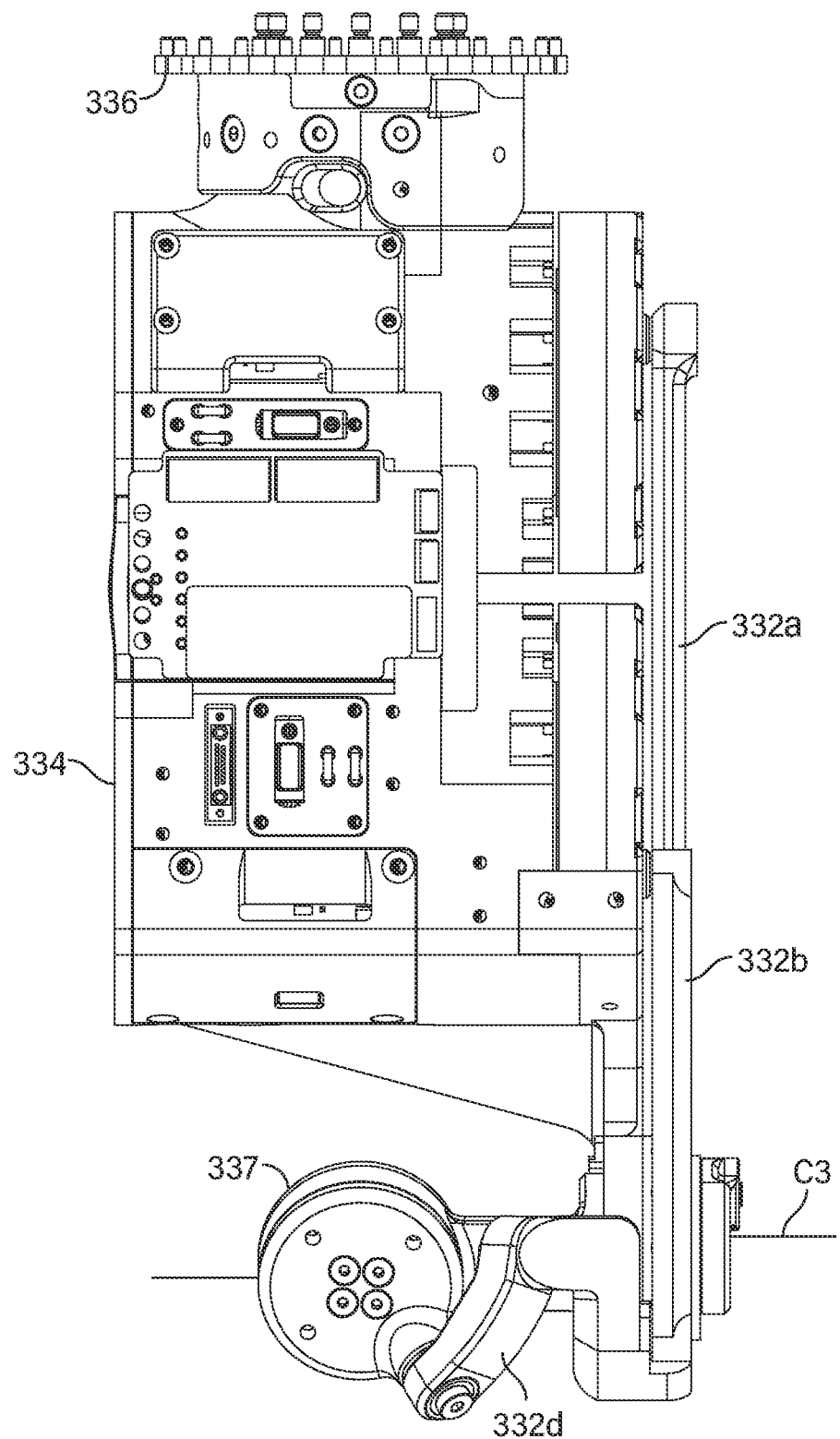
FIG. 3B is a top view of the robotic wrist shown in FIG. 3A.
Figure 3C:
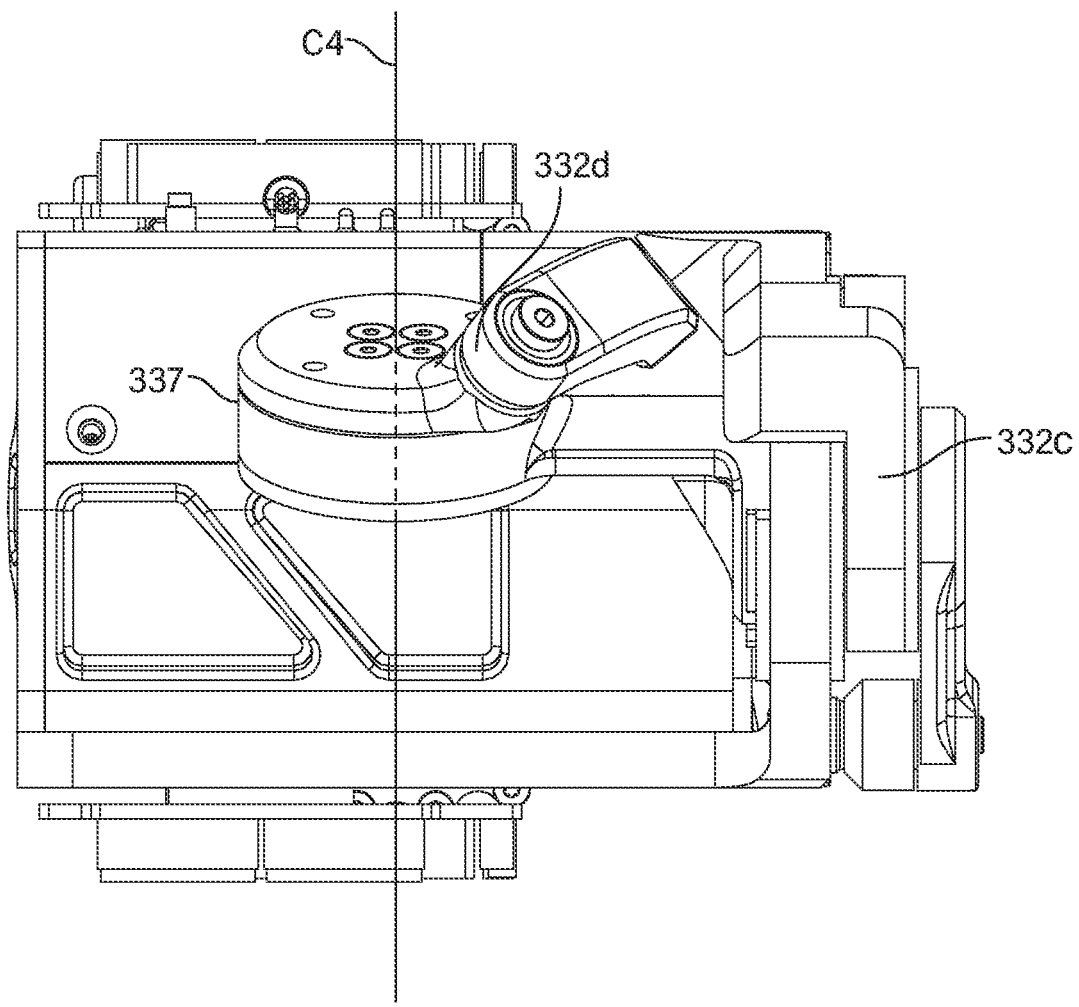
FIG. 3C is an end view of the robotic wrist shown in FIG. 3A.
Figure 4A:
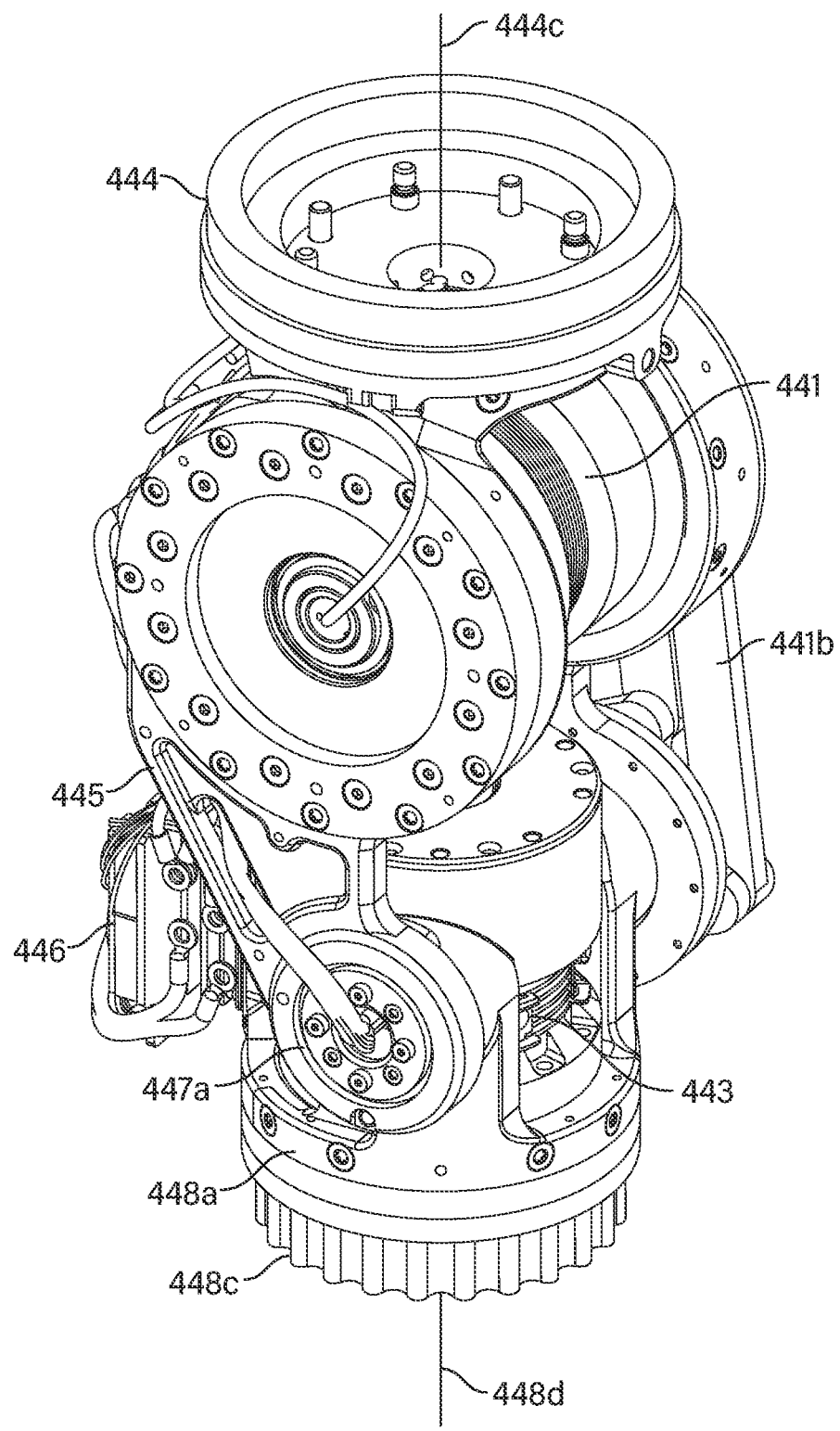
FIG. 4A is a perspective view a robotic elbow in the robotic arm shown in FIG. 2.

FIGS. 3A-3C illustrate various views of an example robotic wrist 300, which may be used in some examples as the robotic wrist (300 in FIG. 2) of a robotic arm (110 in FIG. 2) and a robot (100 in FIG. 1). The robotic wrist 300 may have two degrees of freedom and use a hybrid differential mechanism 331 to effect the two degrees of freedom at a single component interface (e.g., the effector interface 337). In some examples, the two degrees of freedom may include flexion and abduction.

The robotic wrist 300 may comprise a first actuator 333a (e.g., a rotary actuator) and a second actuator 333b (e.g., a rotary actuator) disposed or mounted in a common actuator housing 334. The first actuator 332a and the second actuator 332b may be, for example, and without limitation, rotary actuators (e.g., motors such as electric motors, hydraulic motors or pneumatic motors). Electric motors may be, for example, DC or AC motors, stepper motors, servo motors or selsyn synchronous rotation motors. The actuators 333a, 333b may be disposed in the common actuator housing 334. The rotational axes C1, C2 of the two actuators 333a, 333b in the illustrated example are parallel and may be so maintained by mounting the actuators 333a, 333b in the common actuator housing 334. By disposing the actuators 333a, 333b in the common actuator housing 334, the rotational alignment of the actuators 333a, 333b may be better maintained. Disposing the actuators 333a, 333b in the common actuator housing 334 (or configuring the actuators 333a, 333b in a single package or housing) can also reduce the size of the robotic wrist 300 and avoid a bulky ("Popeye-like" appearance) robotic wrist. Each actuator 333a, 333b may comprise a torque sensor (not shown) functionally coupled to its respective rotary output.

The common actuator housing 334 may be coupled to the robotic elbow (400 in FIG. 2) by an interface 336. As explained in Example III, the robotic elbow (400 in FIG. 2) may comprise a rotation actuator to effect rotation of the robotic wrist 300 about an axis shown at C4.

In some examples, the hybrid differential mechanism 331 includes two linkage arms 332a, 332b. Rotary output (e.g., an output shaft flange, see 307, 310 in FIG. 3D) of each actuator 333a, 333b may be coupled to a respective input (see, 332c, 332d in FIG. 3D), to be explained further below with reference to FIG. 3D, of the hybrid differential mechanism 331. The hybrid differential mechanism 331 enables converting the respective rotary outputs of the actuators 333a, 333b into flexion and abduction motion of the robotic wrist 300. In the illustrated example, the rotary output of the first actuator 333a may be coupled to one input of the hybrid differential mechanism 331, for example, a flexion input arm 332e receiving motion input from the first linkage arm 332a. Rotary motion of the second actuator 333b may be coupled to another input of the hybrid differential mechanism 331, for example, to one end of a spherical linkage input 332d forming part of the hybrid differential mechanism 331. A spherical linkage may comprise a rod or lever having spherical joints at one or both longitudinal ends. Such spherical joint(s) may enable translation of motion between an input and an output of the rod or lever along more than one direction.

When the actuators 333a, 333b rotate synchronously, both the flexion input arm 332e and the spherical linkage input 332d rotate about a common axis of rotation C3. Such rotation results in flexion motion of the end effector interface 337 (i.e., the attachment point for an end effector as explained with reference to FIG. 1), which is coupled to the compound motion plate 305 so as to be rotatable about the common axis of rotation C3 as well as to be rotatable about an abduction axis C4. When the actuators 333a, 333b rotate asynchronously, for example, and without limitation, holding the first actuator 333a in fixed rotary position while rotating the second actuator 333b, the spherical linkage input 332d will rotate relative to the flexion input arm 332e, causing the end effector interface 337 to rotate about the abduction axis C4.

Figure 3D:
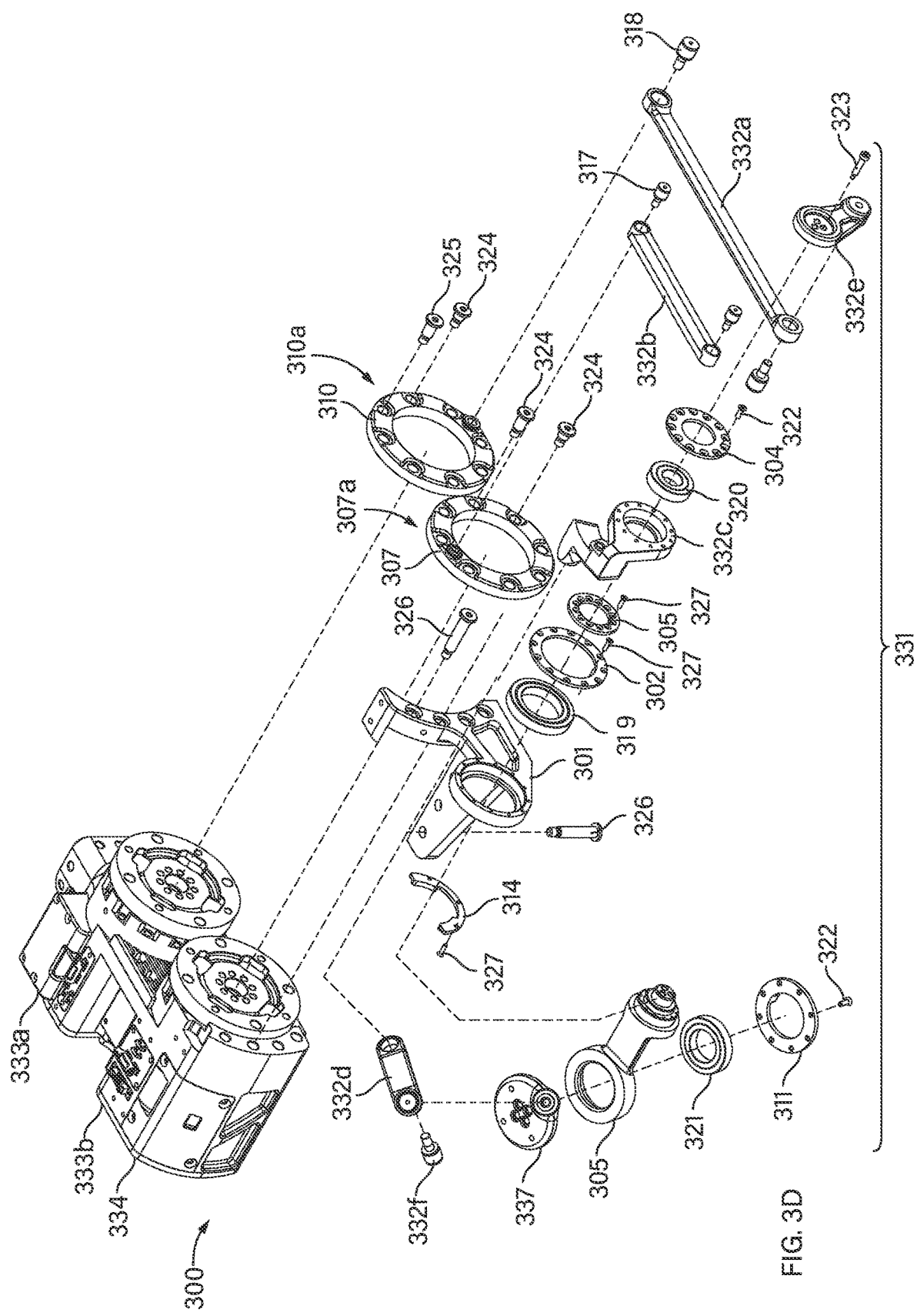
FIG. 3D is an exploded view of the robotic wrist shown in FIG. 3A.

FIG. 3D shows an exploded view of functional components of the example robotic wrist 300 to obtain better understanding of interaction of the movable parts in the robotic wrist 300. As explained with reference to FIGS. 3A through 3C, the actuators 333a, 333b may be disposed in the common actuator housing 334 to help maintain alignment of the actuators 333a, 333b. In some examples, the actuators 333a, 333b may form parts of a dual actuator.

An abduction input eccentric, crank or cam 307a may comprise one of the links 332b being coupled at one end to the rotary output 307 of the second actuator 333b displaced from the rotational axis/centerline C2 such that rotation of the second actuator 333b induces linear motion of the second link 332b. Such linear motion may be transferred to one input of the hybrid differential mechanism 331. The second link 332b may be coupled to the rotary output 307, e.g., to a torque sensor plate of the second actuator 333b, e.g., using a bearing 317. Cap screws (or shoulder bolts) 324, 325 may be used to couple the rotary output 307 to the second actuator 333b.

A flexion input eccentric, crank or cam 310a may comprise the other link 332a being coupled to the rotary output 310, e.g., on the torque sensor plate of the first actuator 333a using, e.g., a bearing 318. Cap screws (or shoulder bolts) 324, 325 may be used to couple the rotary output 310 to the first actuator 333a. A bearing 321, e.g., a crossed roller bearing, may be placed, e.g., pressed into a compound motion (combination) plate 305 part of the differential mechanism 331. The flexion input cam 310a may operate on the same principle as the abduction input cam described above.

An abduction spherical output (e.g., the end effector interface 337) may be placed or pressed into the inner race of the bearing 321 to effectively eliminate axial motion of the bearing 321 relative to the compound motion plate 305. An abduction motion stop (a physical movement stop) 311 may be attached to the compound motion plate 305 (e.g., using cap screws 322).

A wrist frame 301 may be attached to the common actuator housing 301 after assembly of certain components to the wrist frame 301 as will be further explained below.

The compound motion plate 305 may be inserted, e.g., pressed into the inner race of a bearing 319, e.g., a crossed roller bearing. The foregoing bearing 319 will eventually be disposed in a receptable therefor in the wrist frame 301, to ensure no axial motion of bearing 319 occurs relative to the compound motion frame 301.

A flexion bearing plate 302 may be coupled to the wrist frame 301 using, e.g., cap screws 327 to secure the bearing 319 in the wrist frame 301. An inner bearing plate 315 may be attached to the compound motion plate 305 using, e.g., cap screws 327.

A bearing 320, e.g., a crossed roller bearing, may be assembled to, e.g., pressed into the spherical linkage input 332d. The compound motion plate 305 may be pressed into the inner race of the foregoing bearing 320 to ensure that no axial motion of the bearing 320 occurs relative to the compound motion frame 301. A flexion motion stop 314, i.e., a mechanical hard stop, may be affixed to the wrist frame 301, e.g., using cap screws 327. Both of the bearings shown at 319 may be pressed into the spherical linkage input 332d.

The foregoing assembled components may be coupled to the abduction spherical output, i.e., the effector interface 337 and the spherical linkage input 332c. The foregoing assembled components may be coupled to the actuator housing 334 using, e.g., cap crews (shoulder bolts) 326.

Bearings 318, e.g., roller bearings, may be pressed into the ends of the first linkage arm 332a and the second linkage arm 332b.

One of the bearings 318 installed in the one of the linkage arms, specifically the end of the first linkage arm 332a opposed to the end coupled to the flexion input cam 310, may be coupled to the flexion input arm 332e.

The first linkage arm 332a may be coupled to the flexion input cam 310, e.g., and the flexion input arm 332e using, e.g., shoulder screws 323. Similarly, the second linkage arm 332b may be coupled at one end to the compound motion plate 305 using, e.g., shoulder screws 323. The second linkage arm 332b may be coupled at its other end to the abduction input cam 307 (itself coupled to the second actuator 333b torque sensor), through bearings 317. The bearings 317 may be coupled to the respective components using, e.g., shoulder screws, or the bearings 317 may themselves comprise suitable attachment features.

Example V—Example Robotic Elbow

Figure 4B:
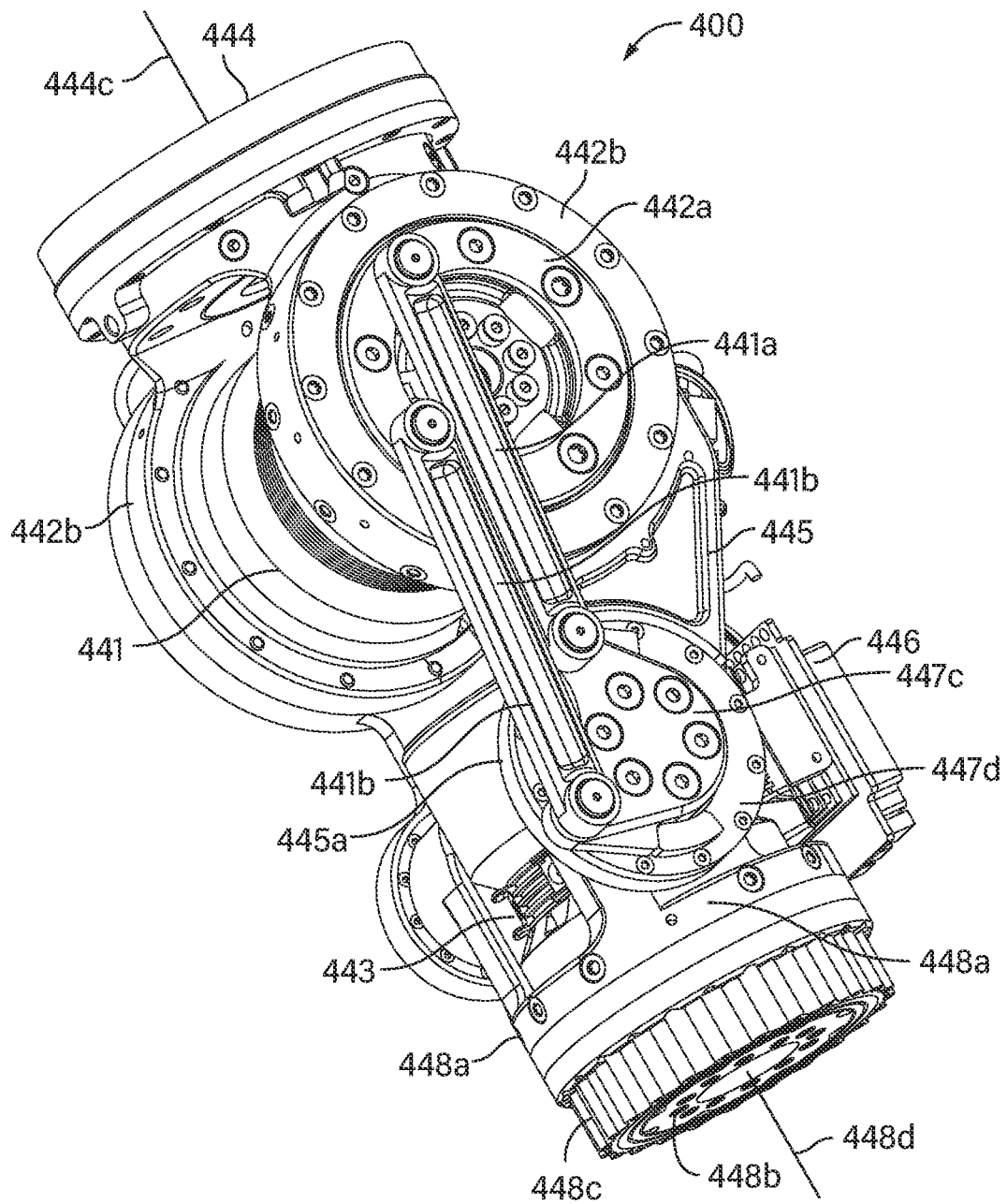
FIG. 4B is a rotated perspective view of the robotic elbow shown in FIG. 4A.

FIGS. 4A and 4B are opposed oblique views of an example robotic elbow 400, in which like reference numerals correspond to like components between the two figures. As explained previously herein, the robotic elbow 400 may comprise two degrees of freedom: flexion motion and rotational motion.

A flexion frame 445 may be rotatably coupled (explained further below) at one end to the robotic shoulder (500 in FIG. 2) by a shoulder interface 444 (which may be part of or assembled to the flexion frame 445) to enable flexion motion of the robotic elbow 400 in a manner to be further explained below. The flexion frame 445 may comprise mounting features to affix the housing of a flexion actuator 442 to the flexion frame 445 and bearings 442b to rotatably support a rotary output 442a of the flexion actuator 442.

The flexion actuator 442 may comprise any form of rotary actuator, such as an electric, hydraulic or pneumatic motor. Electric motors may comprise, for example and without limitation, motors, stepper motors, or servo motors. The rotary output 442a (e.g., a torque sensor flange) of the flexion actuator 442 may be coupled by a first link 441a and a second link 441b to an output arm 447c. The output arm 447c may be rotatably supported in suitable openings in the flexion frame 445 (see FIG. 3C), e.g., by bearings (431 and 415 in FIG. 4C). Rotation of the flexion actuator 442 will thus exert longitudinal force on the first 441a and second 442a links, wherein such longitudinal force is transferred to the output arm 447c. The output arm 447c is coupled to a rotation bracket 448a so as to transfer rotation of the output arm 447c to the rotation bracket 448a. The rotation bracket 448a is rotatably supported in lower end openings 445a of the flexion frame 445 (see FIG. 4C) Such force transfer to the output arm 447c causes the rotation bracket 448A to undergo flexion movement with respect to the shoulder interface 444, i.e., a centerline 448d of the rotation bracket 448a is deflected with reference to the center line 444c of the shoulder interface 444.

In the present example, the first 441a and second 441b links may be coupled at one longitudinal end to the rotary output 442a so as to be rotationally displaced (have a rotational phase separation) with respect to each other. As will be appreciated by those skilled in the art, as the rotary output 442a changes rotational position with respect to the shoulder interface 444, and thus the angle subtended by the longitudinal dimension of each link bar 441a, 441b with reference to the rotary output 442a, the force applied by the flexion actuator 442 to the link bars 441a, 441b may be maintained above zero irrespective of the rotary orientation of the flexion actuator 442. In some examples, the rotational phase displacement of the first link bar 441a from the second link bar 441b is 90 degrees. Correspondingly, the other longitudinal end of each link bar 441a, 441b may be coupled to the output arm 447c in corresponding rotational phase displacement. In some examples, such phase displacement may be 90 degrees. It will be appreciated that having the rotational phase displacement be 90 degrees on each of the rotary output 442a and the output arm 447c may provide substantially constant force applied to the output arm 447c at any rotary orientation of the flexion actuator 442.

The rotation bracket 448a provides support for a rotation actuator 443. The rotation actuator 443 may be a rotary actuator such as any form of motor, as in other example actuators described herein, may be fixedly mounted in the rotation bracket 448a, and may provide rotational mounting of a wrist interface 448c in a bearing housing 448b such that the rotational actuator 443 may rotate the wrist interface 448C about the rotation bracket 448a centerline 448b. The wrist interface 448c may also provide a location to attach the robotic wrist (300 in FIG. 2) as will be further explained herein.

An actuator driver circuit or circuits 446 may be disposed at a convenient location on the flexion frame as shown in FIGS. 4A and 4B, although the illustrated location of the driver circuit(s) 446 is not a limitation on the scope of this disclosure.

Figure 4C:
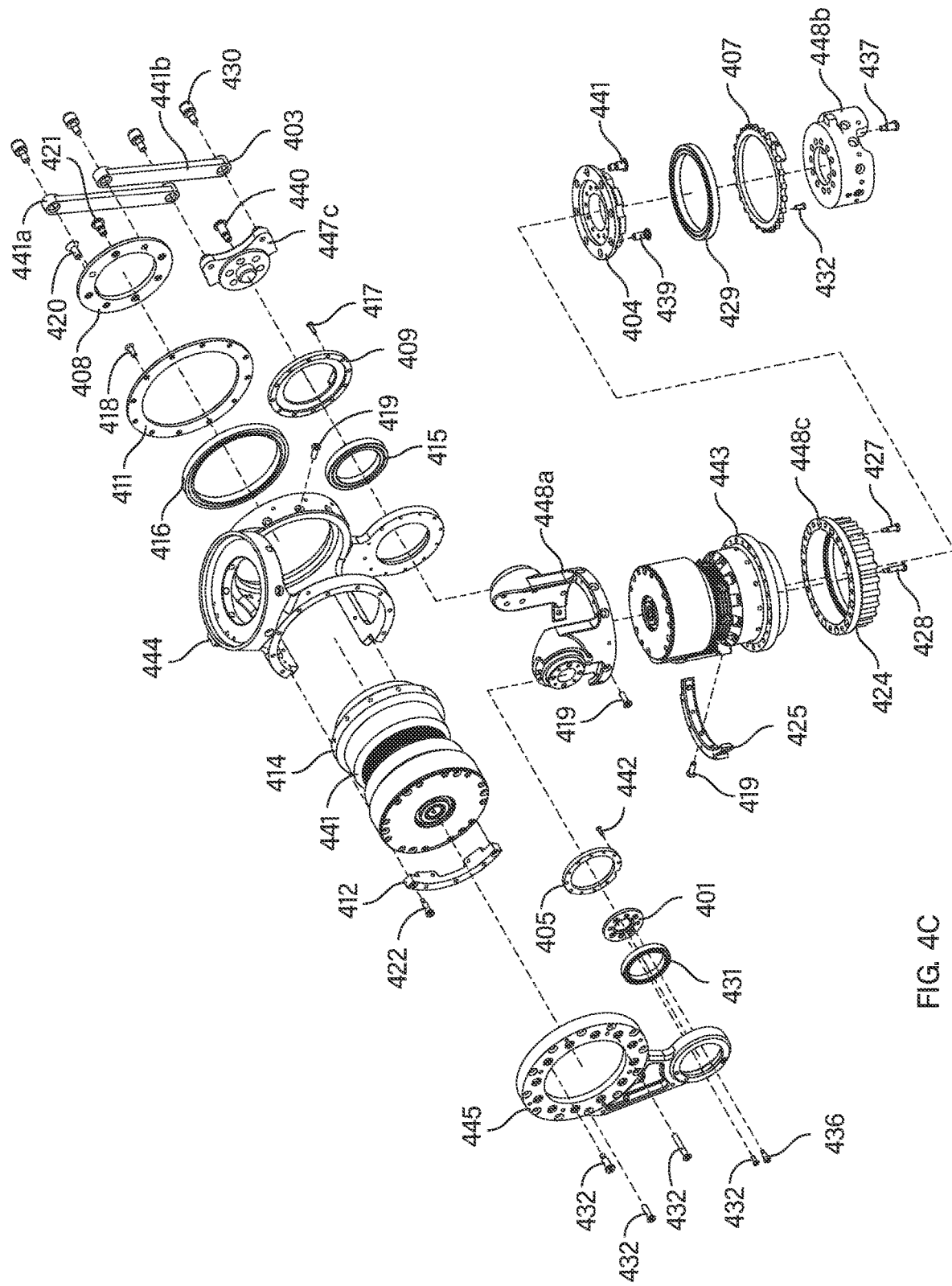
FIG. 4C is an exploded view of the robotic elbow shown in FIGS. 4A and 4B.

FIG. 4C shows an exploded view of the example robotic wrist to provide better understanding of the functional components and how components of the robotic wrist may be assembled. A forearm rotation housing 424 may be attached to the housing of the rotation actuator 443, e.g., by using shoulder screws 427. A forearm rotation inner cap 404 may be attached to a rotary output (e.g., a flange, not shown in FIG. 4C) of the rotation actuator 443, e.g., using low-profile shoulder screws 439, 441. The forearm rotation bearing 429 may be inserted, e.g., pressed into a recess formed in the forearm rotation bearing housing 424 and the forearm rotation inner cap 404.

A forearm rotation bearing plate 407 may be attached to the forearm rotation bearing housing 424 using screws 432 with a tab mounted directly opposite the rotation actuator 443 driver 446 mounting surface as further explained herein.

A wrist rotation coupling 448b may be attached to the forearm rotation inner cap 404 using, e.g., shoulder screws 437 by first aligning a hole in a tab of the forearm rotation bearing plate 407 and then aligning threaded holes in the forearm rotation inner cap 404 with through-holes in the wrist rotation coupling 448b. A forearm rotation bracket clip 425 may be attached to the rotation actuator 443 using, e.g., a cap screw 419.

Bearings 415, 431, e.g., crossed roller bearings, may be inserted, e.g., pressed into receptacles in the flexion frame 445. An elbow flexion input bearing cap 411 may be attached to the flexion frame 445 using, e.g., cap screws 418. The rotation bracket 448a may be pressed into the inner race of bearing 415 while supporting the bearing 415 to avoid relative movement between the bearing 415 and the flexion frame 445.

A hard stop elbow 409 may be attached to the flexion frame 445 using, e.g., screws 417 while ensuring the stop elbow 409 is properly aligned as explained further below. The hard stop elbow 409 limits flexion motion of the flexion frame 445.

The wrist interface 448b may be attached to the rotation inner cap 404 using, e.g., shoulder screws 437 by first aligning the a hole in the tab of a rotation bearing plate 407 and then aligning the threaded holes in the rotation inner cap 404 with through-holes in the wrist interface 448b.

A forearm rotation bracket clip 425 may be attached to the rotation actuator 443 using, e.g., a screw 419. Bearings 415, 431 may be pressed into respective landing openings in the elbow flexion frame 445. A flexion input bearing cap 411 may be attached to the elbow flexion frame 445 using, e.g., screws 418.

The hard stop elbow 409 may be affixed to the flexion frame 445 using, e.g., screws 417 to ensure that the stop elbow 409 is properly aligned as explained further below. The wrist Interface 448b may be attached to the forearm rotation inner cap 404 using, e.g., shoulder screws 437 by first aligning the hole in tab of the forearm rotation bearing plate 407 and then aligning the threaded holes of forearm rotation inner cap 404 with the through-holes of wrist rotation coupling 448b.

A forearm rotation bracket clip 425 may be fastened to the rotation actuator 443 using a screw 419.

A bearing 416 to rotatably support output of the flexion actuator 441 may be pressed into the elbow flexion frame 445.

An elbow flexion input bearing cap 411 may be attached to the elbow flexion frame 445 using screws 418.

The forearm rotation bracket 448a may be pressed into the inner race of bearing 415 while supporting bearing 415 to avoid relative movement between the bearing 415 and the elbow flexion frame 445.

Bearings 420, 421 may attach one end of each link 441a, 441b to the elbow flexion frame 445. The links 441a, 441b may be fastened at the other end into appropriate locations on the output arm 447c using bearings 430 passing through end openings 403 as shown in FIG. 4C. The output arm 447c may be coupled to the elbow flexion frame 445 using, e.g., cap screws 440.

The elbow flexion frame 445 may rotatably support the rotation bracket 448a by pressing the bearings 415, 431 into suitable recesses in the elbow flexion frame 445. An inner bearing race 401 may be attached to the rotation bracket 448A using, e.g., cap screws 436. A bearing retainer 405 may be attached to the elbow flexion frame 445 using, e.g., cap screws 442.

The flexion actuator 441 may be attached to the elbow flexion frame 445 by a mounting flange 414. A hard stop 422 may be attached to part of the flexion actuator 441 using, e.g., cap screws 422.

Example VI—Example Robotic Shoulder

Figure 5A:
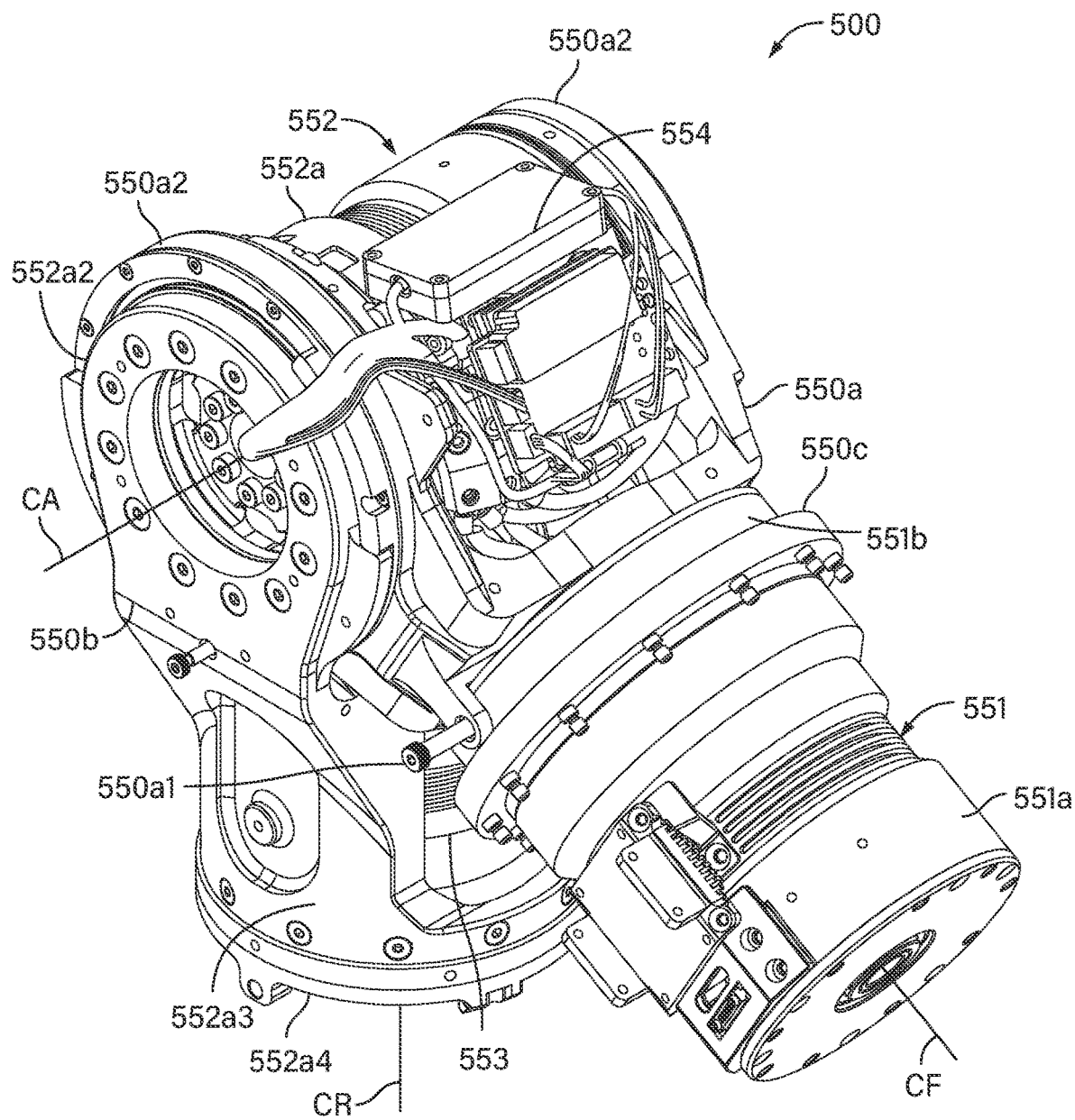
FIG. 5A is a perspective view of a robotic shoulder in the robotic arm shown in FIG. 2.
Figure 5B:
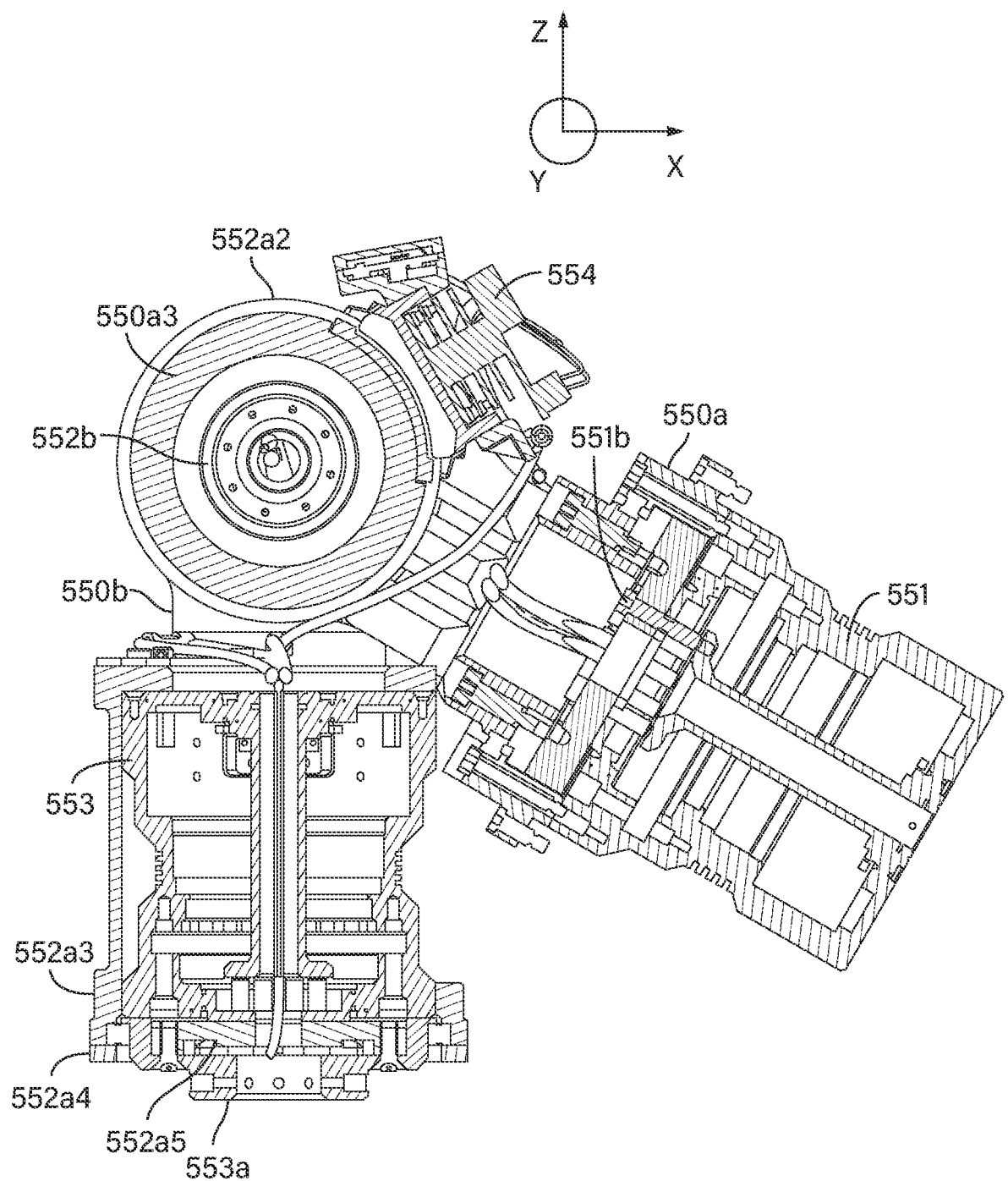
FIG. 5B is a cross-sectional view of robotic shoulder shown in FIG. 5A.

FIGS. 5A and 5B show an oblique and side cut away view, respectively, of an example of a robotic shoulder 500, wherein like components are identified by like numerals. The example shown and described herein may have three degrees of freedom. The robotic shoulder 500 may be capable of flexion motion about a flexion center or axis of rotation CF. The robotic shoulder 500 may also be capable of abduction motion about an abduction axis CA, and rotation about a rotation axis CR.

A flexion frame 550*a* may be rotatably coupled to a torso interface 550C. The torso interface 550*c* may be fixedly coupled through, e.g., the illustrated interface ring to the torso (108 in FIG. 1) in some examples. A flexion actuator 551 may be fixedly attached to the torso interface 550*c* by an actuator housing 551*a*. The flexion actuator 551 may comprise a rotary actuator, e.g., a motor, such as electric motor, hydraulic motor, or pneumatic motor. Electric motors may comprise DC or AC motors, stepper motors or servo motors, for example and without limitation. A rotary output 551B of the flexion actuator 551 may be coupled to the flexion frame 550*a* by one or more fasteners 550*a*1 such as cap screws. Thus, rotation of the flexion actuator 551 is transferred to the flexion housing 550*a* such that the flexion frame 550*a* is caused to rotate about the flexion axis CF.

The frame 550*a* may comprise spaced apart openings 550*a*2, which may be circular openings, in which may be fixedly attached an abduction actuator 552, e.g., by attaching the abduction actuator housing 552*a* within the openings 550*a*2. A driver circuit 554 may be disposed in a suitable location proximate the abduction actuator housing 552*a*. The abduction actuator 552 may be a rotary actuator such as an electric, hydraulic or pneumatic motor. Examples of an electric motor may comprise a DC or AC motor, stepper motor or servo motor.

An abduction frame 550*b* may be coupled to a rotary output 552*b* of the abduction actuator 552. The abduction frame 550*b* may be rotatably supported on the flexion frame 550*a* by bearings 550*a*3, e.g., roller bearings or ball bearings, in flexion bearing supports 552*a*2, which may be arranged adjacent to the openings 550A2 in the flexion frame 550*a*. Thus, operation of the abduction actuator 552 will cause rotation of the abduction frame 550*b* around the abduction axis CA.

The abduction frame 550*b* may comprise at an end opposed to the flexion bearing supports 552*a*2, a rotation bearing support 552*a*3, in which may be disposed a rotation bearing 552*a*5, e.g., a roller bearing or all bearing. The rotation bearing 552*a*5 may be retained in place by a rotation bearing retainer 552*a*4. The rotation bearing rotatably 552*a*5 supports rotary output 553*a* of a rotation actuator 553. A housing of the rotation actuator 553 may be fixedly coupled to the abduction frame 550*b*. The rotary output may be coupled to the shoulder interface (544 in FIG. 4A) of the robotic elbow (400 in FIG. 2) to effect rotation about the rotation axis CR of the robotic elbow (400 in FIG. 2).

Figure 5C:
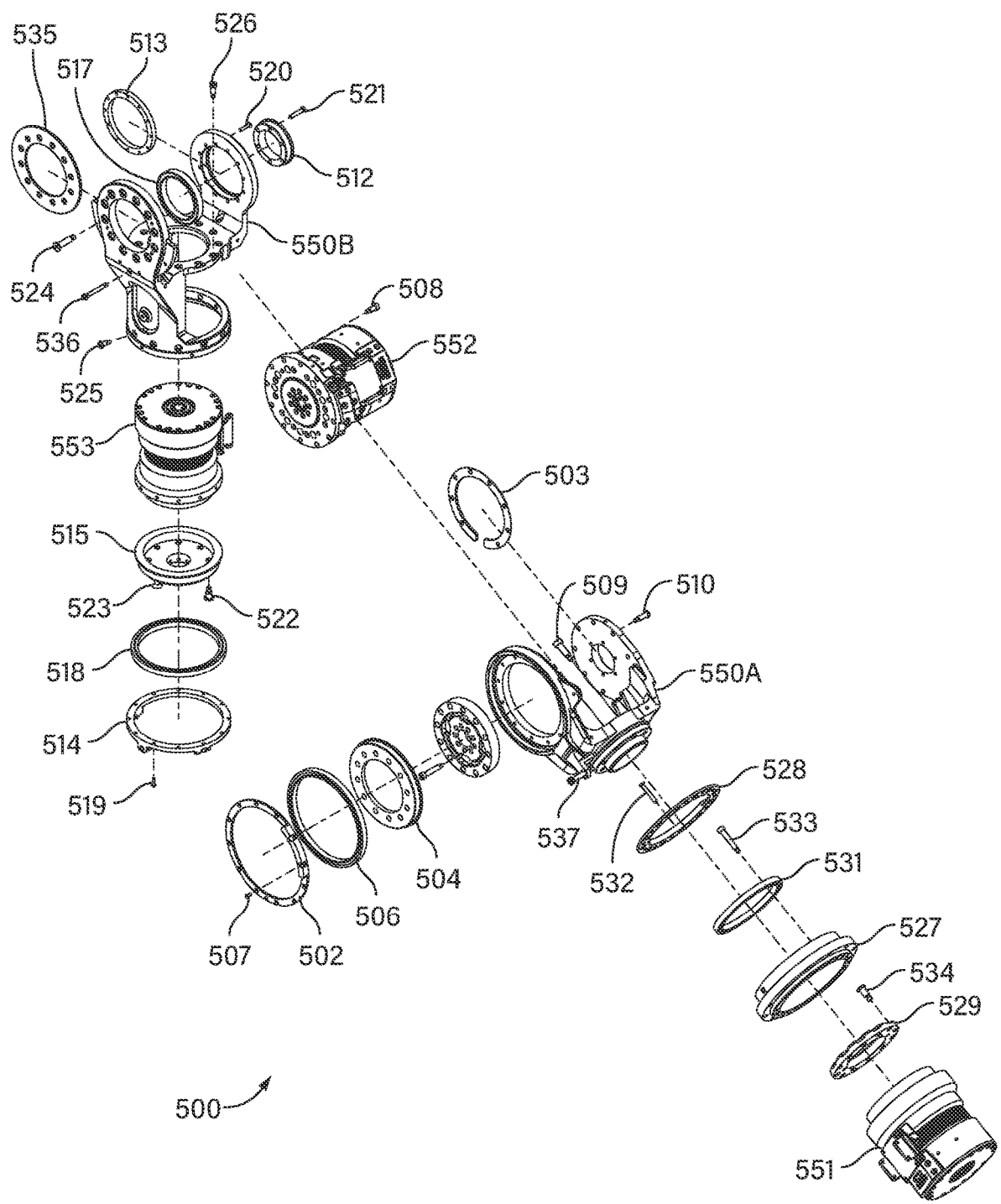
FIG. 5C is an exploded view of the robotic shoulder shown in FIGS. 5A and 5B.

FIG. 5C shows an exploded view of the example robotic shoulder to better understand operation of functional components and assembly of the robotic shoulder. A flexion inner cap 529 may be affixed to the flexion actuator 551, e.g., with shoulder screws 534. A bearing 531 may be pressed into the flexion frame 550A. The bearing 531 may be held in place by a retainer 527. The retainer 527 may be held in place on the flexion frame 550A by a side entering cap screw 537.

The foregoing assemblies may be coupled to each other using, e.g., shoulder screws 533. Ensuring a correct angular orientation, a flexion bearing cap hard rotation stop 528 may be attached, e.g., to the bearing support 527 using cap screws 532.

The foregoing assembly may be attached onto the abduction frame 550B and secured with, e.g., shoulder screws 509 ensuring no interference between the hard rotation stops of the abduction frame 550*a* and the flexion bearing cap hard rotation stop 528.

A bearing 506 may be pressed onto an abduction inner cap 504.

The torque sensor ring (e.g., the rotary output) of the abduction actuator 552 may be removed and the foregoing assembly may be placed onto the surface of the torque sensor ring facing away from the abduction actuator 552.

The assembly from the previous step may be pressed into the abduction frame 550B.

An abduction bearing cap hard rotation stop 502 may be secured to the abduction frame 550*b* using, e.g., cap screw screws 507 in the orientation shown in FIG. 5C, aligning stops with a tab on the abduction frame 550*b*.

The abduction actuator 552 may be inserted into the abduction frame 550*b* and secured, e.g., with shoulder screws 508. Such securing ensures the orientation is correct, as explained below, aligning an actuator driver mounting area with a tab on the abduction frame 550*b*.

The shoulder abduction inner cap 504 may be rotated until holes in the torque sensor ring line up with holes in the abduction actuator 552 and secure the inner cap 504, e.g., with shoulder screws 536.

An abduction spacer 503 may be slid between the abduction actuator 552 and the abduction frame 550*b*.

Using shoulder screws 510, the abduction spacer 503 may be captured while further securing the abduction actuator 552 to the abduction frame 550*b*.

A bearing 518 may be pressed onto a rotation inner cap 515.

The foregoing assembly may be moved onto a rotation actuator 553 using alternating shoulder screws 523 and cap screws 522.

A shoulder abduction ball bearing inner cap may be pressed into a bearing 517, which may be retained in place by a cap 513.

The foregoing assembly may be pressed into a rotation frame 550*c*.

The assembly from above may be pressed into the rotation frame 550*c* and secure with shoulder screws 525, 526, aligning the driver mounting surface of the rotation actuator 553, as explained herein.

The rotation bearing cap 514 may be installed in the orientation show above to the rotation frame 550C using screws 519.

The abduction bearing lip 535 may be placed onto the abduction inner cap 504, ensuring that a raised edge rests against bearing 506.

An abduction bearing back cap 513 may be placed into the recessed surface of the abduction frame 550A.

The partial assembly from above may be placed into the rotation frame 550*c* using, e.g., shoulder screws 524 and cap screws 520.

The abduction bearing inner cap 512 may be attached to the abduction frame 550*a* using screws 521.

Additional Examples

Additional examples based on principles described herein are enumerated below. Further examples falling within the scope of the subject matter of the present disclosure can be configured by, for example, taking one feature of an example in isolation, taking more than one feature of an example in combination, or combining one or more features of one example with one or more features of one or more other examples.

Example 1: A robotic wrist comprising: a hybrid differential comprising a first cam, a second cam, a first input, and a second input, the first cam disposed about a first pivot oriented along a first axis of rotation, the second cam disposed about a second pivot oriented along the first axis; an abduction output coupled to the second cam, the abduction output having a second axis of rotation transverse to the first axis; a first actuator having an output; a second actuator having an output; a first link coupling the output of the first actuator to the first input of the hybrid differential; a second link coupling the output of the second actuator to the second input of the hybrid differential; wherein synchronous motion of the first actuator and the second actuator causes flexion motion of the abduction output about the first axis, and asynchronous motion of the first actuator and the second actuator causes abduction motion of the abduction output about the second axis.

Example 2: A robotic wrist according to Example 1, wherein the first actuator and the second actuator comprise rotary actuators and the output of the first and second actuators comprise a rotary output.

Example 3: A robotic wrist according to example 2, wherein the rotary actuators comprise one of AC motors, DC motors, stepper motors, servo motors, or selsyn synchronous rotation motors.

Example 4: A robotic wrist according to example 3 wherein the first link and the second link are coupled at one end to a periphery of the rotary output of a respective one of the first and second actuators.

Example 5: A robotic wrist according to example 4 wherein the first actuator and the second actuator are disposed in a common frame.

Example 6: A robotic wrist according to example 5 wherein the first actuator and the second actuator are oriented such that respective axes of rotation are parallel.

Example 7: A robotic wrist according to example 6 wherein the first axis is parallel to the respective axis of rotation.

Example 8: A robotic wrist according to any of examples 1 through 7 wherein the abduction output comprises an interface for an end effector.

Example 9: A robotic write according to any of examples 1 through 8 further comprising an interface to couple the robotic wrist at an end opposed to the abduction output to an element of a robotic arm.

Example 10: A robotic arm comprising: a robotic shoulder; a robotic elbow coupled at one end to the robotic shoulder; a robotic wrist coupled at one end to another end of the robotic elbow, wherein the robotic wrist comprises: a hybrid differential comprising a first cam, a second cam, a first input, and a second input, the first cam disposed about a first pivot oriented along a first axis of rotation, the second cam disposed about a second pivot oriented along the first axis; an abduction output coupled to the second cam, the abduction output having a second axis of rotation transverse to the first axis; a first actuator having an output; a second actuator having an output; a first link coupling the output of the first actuator to the first input of the hybrid differential; and a second link coupling the output of the second actuator to the second input of the hybrid differential; wherein synchronous motion of the first actuator and the second actuator causes flexion motion of the abduction output about the first axis, and asynchronous motion of the first actuator and the second actuator causes abduction motion of the abduction output about the second axis.

Example 11: A robotic arm according to example 10 wherein the first actuator and the second actuator comprise rotary actuators and the output of the first and second actuators comprise rotary outputs.

Example 12: A robotic arm according to example 11 wherein the rotary actuators comprise one of AC motors, DC motors, stepper motors, servo motors or selsyn synchronous rotation motors.

Example 13: A robotic arm according to example 12 wherein the first link and the second link are coupled at one end to a periphery of the rotary output of a respective one of the first and second actuators.

Example 14: A robotic arm according to example 13 wherein the first actuator and the second actuator are disposed in a common frame.

Example 15: A robotic arm according to example 14 wherein the first actuator and the second actuator are oriented such that respective axes of rotation are parallel.

Example 16: A robotic arm according to example 15 wherein the first axis is parallel to the respective axis of rotation.

Example 17: A robotic arm according to any of examples 10 through 16 wherein the abduction output comprises an interface for an end effector.

Example 18: A robotic arm according to any of examples 10 through 17 wherein the robotic shoulder comprises three degrees of freedom.

Example 19: A robotic arm according to any of examples 10 through 18 wherein the robotic elbow comprises two degrees of freedom.

Example 20: A robot comprising: a robot body comprising a robot torso, a robot head coupled to the robot torso, at least one of a robot leg coupled to the robot torso or a mobile platform coupled to the robot torso; and at least one robotic arm coupled to the robot torso, the at least one robot arm comprising: a robotic shoulder coupled at one end to the robot torso; a robotic elbow coupled at one end to another end of the robotic shoulder; a robotic wrist coupled at one end to another end of the robotic elbow; and an end effector coupled to another end of the robotic wrist, wherein the robotic wrist comprises: a hybrid differential comprising a first cam, a second cam, a first input, and a second input, the first cam disposed about a first pivot oriented along a first axis of rotation, the second cam disposed about a second pivot oriented along the first axis; an abduction output coupled to the second cam, the abduction output having a second axis of rotation transverse to the first axis; a first actuator having an output; a second actuator having an output; a first link coupling the output of the first actuator to the first input of the hybrid differential; and a second link coupling the output of the second actuator to the second input of the hybrid differential; wherein synchronous motion of the first actuator and the second actuator causes flexion motion of the abduction output about the first axis, and asynchronous motion of the first actuator and the second actuator causes abduction motion of the abduction output about the second axis.

Example 21: A robot according to example 20 wherein the first actuator and the second actuator comprise rotary actuators and the output of the first and second actuators comprise a rotary output.

Example 22: A robot according to example 21 wherein the rotary actuators comprise one of AC motors, DC motors, stepper motors, servo motors or selsyn synchronous rotation motors.

Example 23: A robot according to example 21 wherein the first link and the second link are coupled at one end to a periphery of the rotary output of a respective one of the first and second actuators.

Example 24: A robot according to example 21 wherein the first actuator and the second actuator are disposed in a common frame.

Example 25: A robot according to example 24 wherein the first actuator and the second actuator are oriented such that respective axes of rotation are parallel.

Example 26: A robot according to example 25 wherein the first axis is parallel to the respective axis of rotation.

Example 27: A robot according to any of examples 20 through 26 wherein the abduction output comprises an interface for an end effector.

Example 28: A robot according to any of examples 20 through 27 wherein the robotic shoulder comprises three degrees of freedom.

Example 29: A robot according to any of examples 20 through 28 wherein the robotic elbow comprises two degrees of freedom.

Example 30: A robotic wrist, comprising a frame; an interface disposed at one end of the frame having features enabling connection of the frame to an elbow of a robotic arm; a first actuator and a second actuator disposed in the frame such that axes of rotation of the first and second actuators are parallel; a first link coupled to a rotary output of the first actuator at one end and at another end to one input of a hybrid differential; a second link coupled at one end to a rotary output of the second actuator and at another end to a second input of the hybrid differential; wherein the hybrid differential is rotatably coupled to the frame such that a first axis of rotation is parallel to axes of rotation of the first and second actuators, the hybrid differential comprising a spherical link coupled between a linear motion input and an effector interface output rotatably mounted on the hybrid differential along a second axis transverse to the first axis; the first link coupled at another end to a first input to the hybrid differential; the second link coupled at another end to the linear motion input to the hybrid differential; and wherein synchronous motion of the first actuator and the second actuator causes flexion motion of the effector interface about the first axis, asynchronous motion of the first and second actuators causes abduction motion of the effector interface about the second axis.

Example 31: A robotic arm, comprising: a robotic shoulder having three degrees of freedom, the robotic shoulder having an interface for coupling to a robot body at one end and an interface for coupling to a robotic elbow at another end; a robotic elbow coupled at one end to the other end of the robotic shoulder, the robotic elbow comprising two degrees of freedom, the robotic elbow comprising an interface for coupling to a robotic wrist at another end; a robotic wrist coupled at one end to the other end of the robotic elbow, wherein the robotic wrist comprises: a frame; an interface disposed at one end of the frame having features enabling connection of the frame to an elbow of a robotic arm; a first actuator and a second actuator disposed in the frame such that axes of rotation of the first and second actuators are parallel; a first link coupled to a rotary output of the first actuator at one end and at another end to one input of a hybrid differential; a second link coupled at one end to a rotary output of the second actuator and at another end to a second input of the hybrid differential; wherein the hybrid differential is rotatably coupled to the frame such that a first axis of rotation is parallel to axes of rotation of the first and second actuators, the hybrid differential comprising a spherical link coupled between a linear motion input and an effector interface output rotatably mounted on the hybrid differential along a second axis transverse to the first axis; the first link coupled at another end to a first input to the hybrid differential; the second link coupled at another end to the linear motion input to the hybrid differential; and wherein synchronous motion of the first actuator and the second actuator causes flexion motion of the effector interface about the first axis, asynchronous motion of the first and second actuators causes abduction motion of the effector interface about the second axis.

Example 32: A robot comprising: a robot body comprising a robot torso, a robot head coupled to the robot torso and at least one of a robot leg coupled to the robot torso or a mobile platform coupled to the robot torso; and a robotic arm, comprising: a robotic shoulder having three degrees of freedom, the robotic shoulder having an interface for coupling to a robot body at one and an interface for coupling to a robotic elbow at another end; a robotic elbow coupled at one end to the other end of the robotic shoulder, the robotic elbow comprising two degrees of freedom, the robotic elbow comprising an interface for coupling to a robotic wrist at another end; a robotic wrist coupled at one end to the other end of the robotic elbow, wherein the robotic wrist comprises: a frame; an interface disposed at one end of the frame having features enabling connection of the frame to an elbow of a robotic arm; a first actuator and a second actuator disposed in the frame such that axes of rotation of the first and second actuator are parallel; a first link coupled to a rotary output of the first actuator at one and at another end to one input of a hybrid differential; a second link coupled at one end to a rotary output of the second actuator and at another end to a second input of the hybrid differential; wherein the hybrid differential is rotatably coupled to the frame such that a first axis of rotation is parallel to axes of rotation of the first and second actuators, the hybrid differential comprising a spherical link coupled between a linear motion input and an effector interface output rotatably mounted on the hybrid differential along a second axis transverse to the first axis; the first link coupled at another end to a first input to the hybrid differential; the second link coupled at another end to the linear motion input to the hybrid differential; and wherein synchronous motion of the first actuator and the second actuator causes flexion motion of the effector interface about the first axis, asynchronous motion of the first and second actuators causes abduction motion of the effector interface about the second axis.

The invention claimed is:

1. A robotic wrist comprising:
   a first actuator having a first actuator axis and a first rotary output axially aligned with the first actuator axis, wherein the first rotary output is rotatable about the first actuator axis;
   a second actuator having a second actuator axis and a second rotary output axially aligned with the second actuator axis, wherein the second rotary output is rotatable about the second actuator axis, wherein the second actuator axis is parallel to and laterally offset from the first actuator axis;
   a first linkage arm having one end coupled to the first rotary output and radially displaced from the first actuator axis;

a second linkage arm having one end coupled to the second rotary output and radially displaced from the second actuator axis;
an abduction output rotatable about a first rotational axis and about a second rotational axis transverse to the first rotational axis, wherein the first rotational axis is parallel to the first actuator axis and the second actuator axis;
a first input linkage coupling the first linkage arm and the second linkage arm, wherein the first input linkage comprises an input arm; and
a second input linkage coupling the first linkage input and the abduction output, wherein the second input linkage comprises a spherical linkage;
wherein synchronous operation of the first actuator and the second actuator causes rotation of the input arm and the spherical linkage about a common axis parallel to the first actuator axis and rotation of the abduction output about the first rotational axis; and
wherein asynchronous operation of the first actuator and the second actuator causes rotation of the spherical linkage relative to the input arm and rotation of the abduction output about the second rotational axis.

2. The robotic wrist of claim 1, further comprising an end effector interface coupled to the abduction output.

3. The robotic wrist of claim 1, wherein the first actuator and the second actuator comprise rotary actuators.

4. The robotic wrist of claim 3, wherein the rotary actuators comprise one of AC motors, DC motors, stepper motors, servo motors, or selsyn synchronous rotation motors.

5. The robotic wrist of claim 3, wherein the first actuator and the second actuator are disposed in a common frame.

6. A robotic arm comprising:
a robotic shoulder;
a robotic elbow movably coupled to the shoulder;
a robotic wrist movably coupled to the elbow, the robotic wrist comprising:
a first actuator having a first actuator axis and a first rotary output axially aligned with the first actuator axis, wherein the first rotary output is rotatable about the first actuator axis;
a second actuator having a second actuator axis and a second rotary output axially aligned with the second actuator axis, wherein the second rotary output is rotatable about the second actuator axis, wherein the second actuator axis is parallel to the first output axis;
a first linkage arm having one end coupled to the first rotary output and radially displaced from the first actuator axis;
a second linkage arm having one end coupled to the second rotary output and radially displaced from the second actuator axis;
an abduction output rotatable about a first rotational axis and about a second rotational axis transverse to the first rotational axis, wherein the first rotational axis is parallel to the first actuator axis and the second actuator axis;
a first input linkage coupling the first linkage arm and the second linkage arm, wherein the first input linkage comprises an input arm; and
a second input linkage coupling the first linkage input and the abduction output, wherein the second input linkage comprises a spherical linkage;
wherein synchronous operation of the first actuator and the second actuator causes rotation of the input arm and the spherical linkage about a common axis parallel to the first actuator axis and rotation of the abduction output about the first rotational axis; and
wherein asynchronous operation of the first actuator and the second actuator causes rotation of the spherical linkage relative to the input arm and rotation of the abduction output about the second rotational axis.

7. The robotic arm of claim 6, further comprising an end effector interface coupled to the abduction output.

8. The robotic arm of claim 6, wherein the first actuator and the second actuator comprise rotary actuators.

9. The robotic arm of claim 8, wherein the rotary actuators comprise one of AC motors, DC motors, stepper motors, servo motors, or selsyn synchronous rotation motors.

10. The robotic arm of claim 8, wherein the first actuator and the second actuator are disposed in a common frame.

11. The robotic arm of claim 6, wherein the robotic shoulder comprises three degrees of freedom.

12. The robotic arm of claim 6, wherein the robotic elbow comprises two degrees of freedom.

13. A robot comprising:
a robotic torso; and
a first robotic arm coupled to the robotic torso, the first robotic arm comprising a robotic shoulder coupled to the robotic torso, a robotic elbow coupled to the robotic shoulder, and a robotic wrist coupled to the robotic elbow, the robotic wrist comprising:
a first actuator having a first actuator axis and a first rotary output axially aligned with the first actuator axis, wherein the first rotary output is rotatable about the first actuator axis;
a second actuator having a second actuator axis and a second rotary output axially aligned with the second actuator axis, wherein the second rotary output is rotatable about the second actuator axis, wherein the second actuator axis is parallel to the first output axis;
a first linkage arm having one end coupled to the first rotary output, wherein the one end of the first linkage arm is radially displaced from the first actuator axis such that rotation of the first rotary output about the first actuator axis induces linear motion of the first linkage arm;
a second linkage arm having one end coupled to the second rotary output and radially displaced from the second actuator axis;
an abduction output rotatable about a first rotational axis and about a second rotational axis transverse to the first rotational axis, wherein the first rotational axis is parallel to the first actuator axis and the second actuator axis;
a first input linkage coupling the first linkage arm and the second linkage arm, wherein the first input linkage comprises an input arm; and
a second input linkage coupling the first linkage input and the abduction output, wherein the second input linkage comprises a spherical linkage;
wherein synchronous motion of the first actuator and the second actuator causes rotation of the input arm and the spherical linkage about a common axis parallel to the first actuator axis and rotation of the abduction output about the first rotational axis; and
wherein asynchronous motion of the first actuator and the second actuator causes rotation of the spherical linkage relative to the input arm and rotation of the abduction output about the second rotational axis.

14. The robot of claim 13, wherein the robotic wrist further comprises an end effector interface coupled to the abduction output, and further comprising an end effector coupled to the end effector interface.

\* \* \* \* \*